US006367124B1

(12) United States Patent
Bella et al.

(10) Patent No.: US 6,367,124 B1

(45) Date of Patent: Apr. 9, 2002

(54) DAMPER AND A DOOR HANDLE

(75) Inventors: Joseph J. Bella, Wheaton; Steven L. Bivens, Kankakee, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/393,592

(22) Filed: Sep. 9, 1999

(51) Int. Cl.[7] .............................. B62B 7/00; E05B 1/00; E05B 5/00

(52) U.S. Cl. .............................................. 16/412; 16/438

(58) Field of Search ............................ 16/412, 438, 54, 16/82, DIG. 9; 188/290, 322.5; 292/336.3

(56) References Cited

U.S. PATENT DOCUMENTS

| | | | | | |
|---|---|---|---|---|---|
| 1,688,472 | A | | 10/1928 | Shaw | |
| 2,851,296 | A | | 9/1958 | Guyaz | |
| 3,512,210 | A | | 5/1970 | Ratcliffe | |
| 4,766,619 | A | * | 8/1988 | Takeda | 4/251 |
| 4,893,522 | A | * | 1/1990 | Arakawa | 16/82 |
| 5,001,809 | A | * | 3/1991 | Kim et al. | 16/62 |
| 5,035,455 | A | | 7/1991 | Kurosaki | |
| 5,056,838 | A | | 10/1991 | Tiesler et al. | |
| 5,092,642 | A | | 3/1992 | Lindmayer et al. | |
| 5,210,905 | A | | 5/1993 | Dietz et al. | |
| 5,449,054 | A | * | 9/1995 | Wiese et al. | 16/82 |
| 5,509,703 | A | | 4/1996 | Lau et al. | |
| 5,630,630 | A | | 5/1997 | Price et al. | |
| 5,743,575 | A | | 4/1998 | McFarland | |
| 5,803,404 | A | | 9/1998 | Petrou et al. | |
| 5,862,690 | A | | 1/1999 | Jancsek | |
| 5,862,896 | A | * | 1/1999 | Villbrandt et al. | 188/293 |
| 5,898,973 | A | | 5/1999 | Schmidt | |

FOREIGN PATENT DOCUMENTS

| | | |
|---|---|---|
| JP | H1-250571 | 10/1989 |

* cited by examiner

*Primary Examiner*—Chuck Y. Mah

(74) *Attorney, Agent, or Firm*—Pitney, Hardin, Kipp & Szuch LLP

(57) ABSTRACT

The door handle assembly includes a door handle which pivots about a pivot axis. A molded-in gear rack is formed on the door handle. The gears of the molded-in gear rack mesh with gears of a rotational damper so that the door handle pivots in concert with the rotation of the gears of the rotational damper. Furthermore, the rotational damper is generally cylindrical and further includes two pairs of radially outwardly extending wings. The rotational damper passes through an aperture in a damper support plate and the first pair of radially outwardly extending wings engage a first side of the damper support plate and engage or abut detent elements. The second pair of radially outwardly extending wings engage a second side of the damper support plate and limit the insertion of the damper through the damper support plate.

6 Claims, 4 Drawing Sheets

DAMPER AND A DOOR HANDLE

BACKGROUND OF THE INVENTION

1. Field of the Invention

This invention pertains to damper for a door handle. More particularly, the present invention provides a molded-in gear rack on the pivoting component of the door handle and a fluid gear damper snapped into a boss on the housing of the door handle. Furthermore, the gear damper includes a rib configuration which allows the gear damper to be rotated one-quarter turn to engage the door handle housing.

2. Description of the Prior Art

The use of cylindrical dampers mounted on the hinges of automotive door handles and similar applications is known in the prior art. However, such a damper is typically relatively large in order to provide the surface area needed to dampen the strong spring force in the door handle because it is mounted on the hinge and experiences the maximum torque from the spring.

These prior art dampers have similarly been bulky to package. Moreover, it has been somewhat difficult to calculate the expected closing time of the handle and any variation of this closing time typically was achieved by changing the surface area of the damper, which further affects the size of the damper and can require a substantial redesign of the damper. Finally, the dampers have typically required several steps for installation which is of concern during assembly-line or automated manufacture.

OBJECTS AND SUMMARY OF THE INVENTION

It is therefore an object of this invention to provide a damper for an automotive door handle or similar application which is relatively compact.

It is therefore a further object of this invention to provide a damper for an automotive door handle or similar application which is simple to package.

It is therefore a still further object of this invention to provide a damper for an automotive door handle or similar application for which the expected closing time is relatively simple to calculate.

It is therefore a still further object of this invention to provide a damper for an automotive door handle or similar application wherein the required redesign to vary the expected closing time of the door is minimized.

It is therefore a still further object of this invention to provide a damper for an automotive door handle or similar application wherein the damper can be simply assembled and installed.

These and other objects are attained by providing a damper for an automotive door handle or similar application which includes a molded-in gear rack on the pivoting mechanism of the door handle and a fluid gear damper which is snapped into a boss on the housing of the door handle. The gear on the damper is of the same pitch as the molded-in gear rack and the pitch circles are tangent.

The gear damper is a one-quarter turn viscous door handle gear damper. During assembly, the damper is placed through the molded opening in the door handle housing and turned one-quarter turn. Lower ribs on the damper housing contact the back side of the door handle housing and top ramped ribs on the damper housing are forced over bumps molded on the top surface of the door handle housing. The damper locks into position by the top ramped ribs being forced over the bumps. After installation, the damper gear meshes with a gear rack molded to the back of the pivoting handle.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
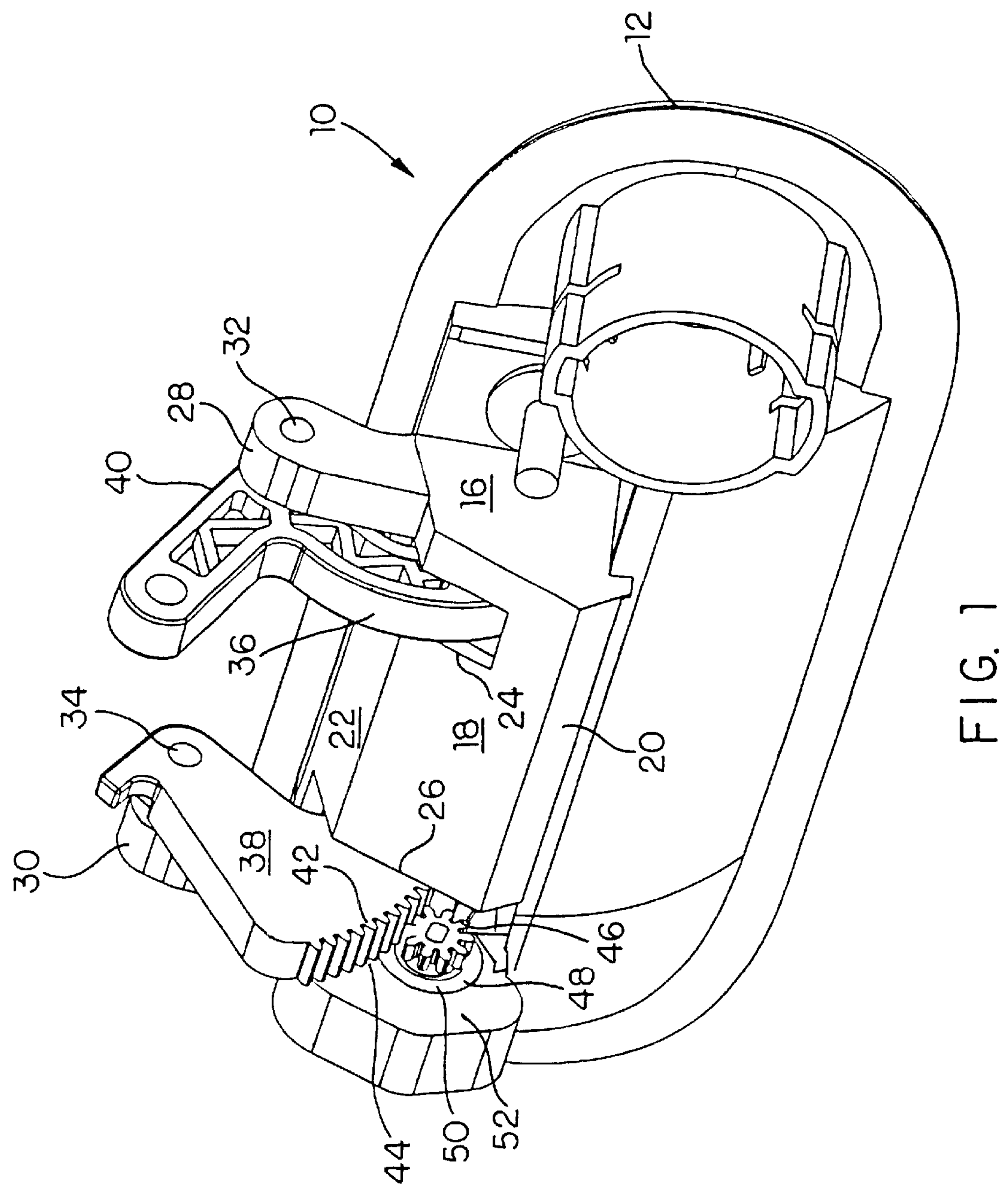
FIG. 1 is a perspective drawing of the door handle assembly of the present invention.

Referring now to the drawings in detail wherein like numerals refer to like elements throughout the several views, one sees that FIG. 1 is a perspective view of the door handle assembly 10 of the present invention, as viewed outwardly from the interior of the automotive door panel (not shown). Door handle assembly 10 includes exterior plate 12 which is typically nearly flush with the exterior or exposed surface of the automotive door. The remaining elements of FIG. 1 are within the interior of the automotive door. A handle recess is formed on the exterior of the automotive door by inwardly extending wall 16 which meets upper and lower oblique walls 18, 20 and upper support wall 22. Slot 24 is formed on upper oblique wall 18 and upper support wall 22 inwardly adjacent from inwardly extending wall 16. Likewise, slot 26 is formed parallel to slot 24 at an end of walls 18, 20, 22. Pivot support 28 extends upwardly inwardly extending wall 16. Likewise, pivot support 30 extends upwardly from an unillustrated wall which bounds the handle recess. Pivot supports 28, 30 provide pivots 32, 34 which form a pivot axis therebetween upon which arms 36, 38 of door handle 40 are journalled for rotation. Handle grip (not shown, but would be visible by viewing FIG. 1 from the opposite direction) is integrally formed with arms 36, 38 and spans between arms 36, 38 within the handle recess formed by walls 16, 18, 20, 22.

Gear rack 42 is molded into distal surface 44 of arm 38. The extent of gear rack 42 is formed equidistantly from pivot 34. That is, the extent of gear rack 42 is a portion of a circle. Gear rack 42 engages circular gear 46 of circular damper 48. Circular damper 48 is engaged within aperture 50 formed within planar damper support plate 52. The circular gear 46 of circular damper 48 is of the same pitch as the gears of gear rack 42, and the pitch circles of circular gear 46 and the gears of gear rack 42 are tangent. Arm 38 therefore pivots in concert with the rotation of circular gear 46 by the meshing of gear rack 42 with circular gear 46. Further, the molded-in gear rack 42 provides a radius from the pivot 34 that decreases the tangential force on the circular damper 48. The closing time of the door handle 40 can be easily calculated and modified by changing the pitch diameter of the molded-in gear rack 42 rather than changing the surface area of the circular damper 48 which would affect the size of circular damper 48.

Figure 2:
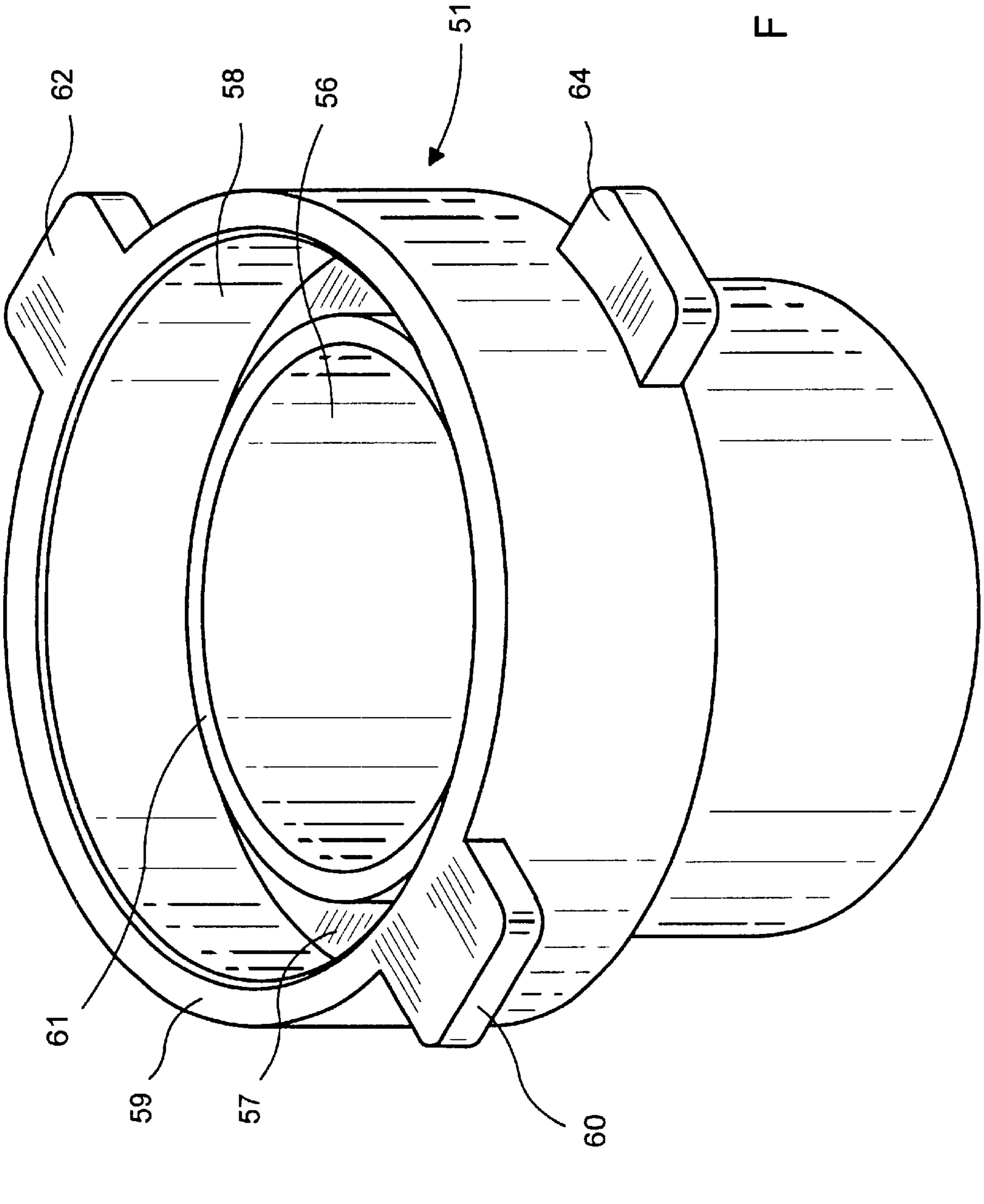
FIG. 2 is a perspective view of the damper assembly housing of the present invention.
Figure 3:
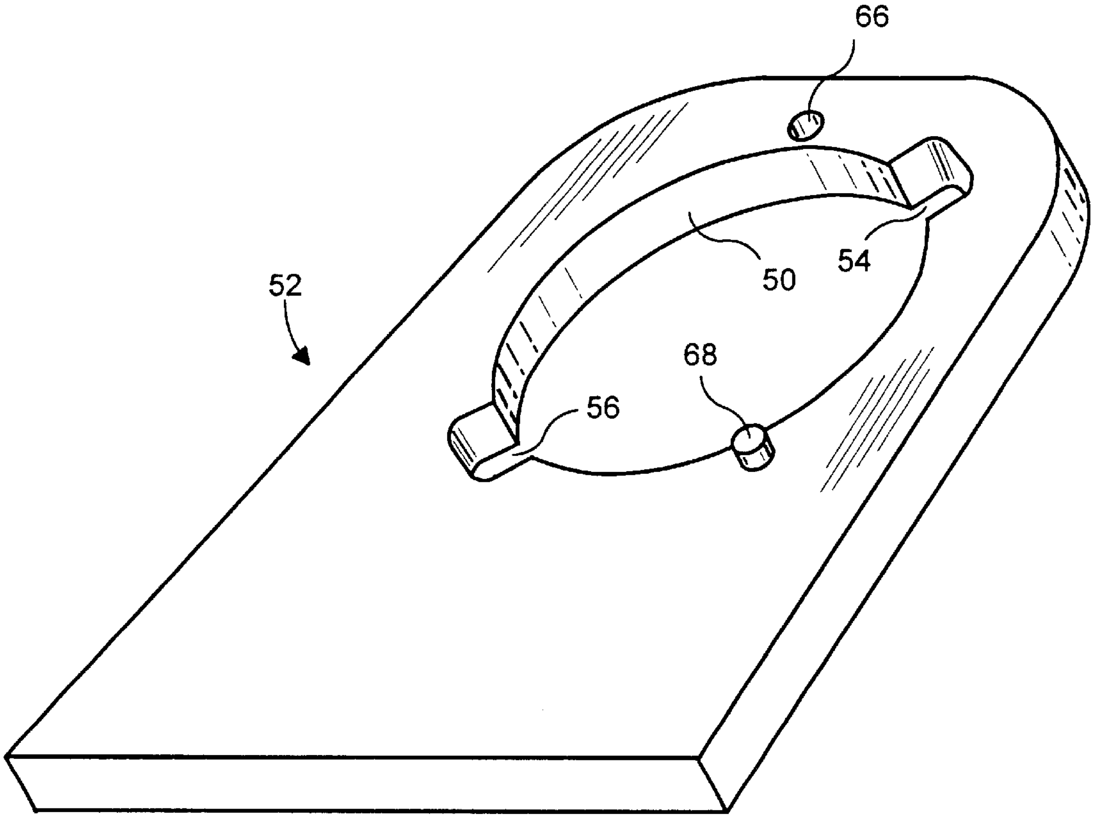
FIG. 3 is a perspective view of the planar damper support plate which engages the damper assembly housing of the present invention.
Figure 4:
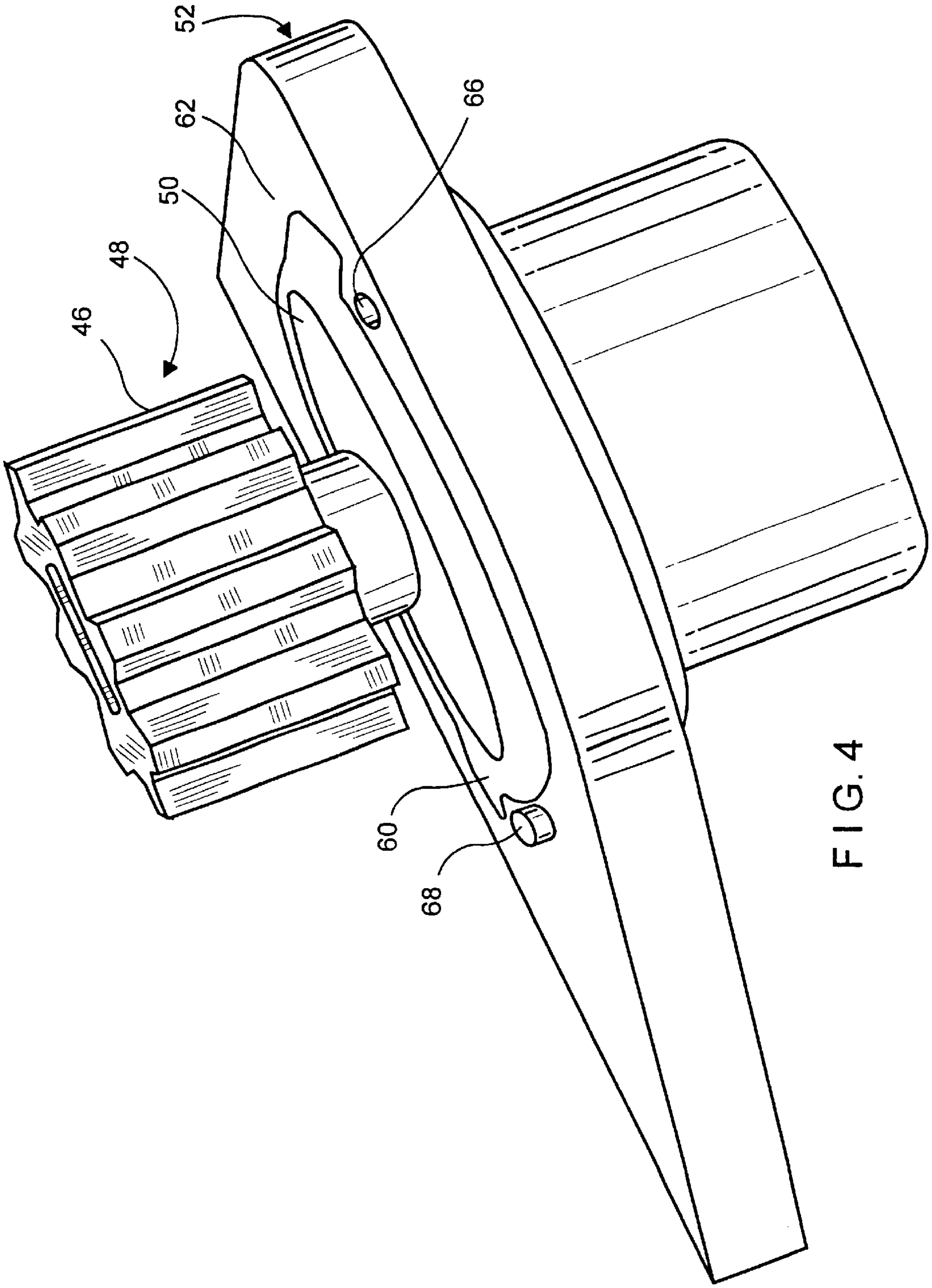
FIG. 4 is a perspective view of the damper assembly housing engaged within the planar damper support plate.

Housing 51 of circular damper 48 is shown in FIG. 2 while planar damper support plate 52 is shown in FIG. 3 and the assembled circular damper 48 on planar damper support plate 52 is shown in FIG. 4.

Housing 51 of circular damper 48 includes a cylindrical portion 56 of a first diameter, and a cylindrical mouth 58 of an increased second diameter. Toroidal wall 57 joins cylindrical portion 56 to cylindrical mouth 58 and cylindrical wall 59 extends upwardly from toroidal wall 57 forming inner circular lip 61. Upper ramped ribs 60, 62 extend radially outward from the top of cylindrical mouth 58 and lower ramped rib 64 (along with an unillustrated lower ramped rib spaced 180° about the periphery of cylindrical mouth 58 from lower ramped rib 64). The distance between the lower surface of upper ramped ribs 60, 62 and the upper surface of lower ramped ribs 64 as measured parallel to the longitudinal axis of circular damper 48 is equal to the thickness of planar damper support plate 52 so that ribs 60, 62, 64 serve to longitudinally position circular damper within aperture 50 as shown in FIG. 4.

As shown in FIG. 3, planar damper support plate 52 includes aperture 50 of the second diameter (that is, to allow cylindrical mouth 58 of damper housing 51 to pass therethrough) which further includes diametrically opposed radially outwardly extending wing openings 54, 56 which are shaped to allow upper ramped ribs 60, 62 to pass therethrough. Hemispherical detent bump 66 and cylindrical stop 68 are formed on a planar surface of planar damper support plate 52 immediately outwardly adjacent from aperture 50.

To assemble circular damper 48 with planar damper support plate 52, cylindrical mouth 58 of damper housing 51 is passed through aperture 52 with upper ramped ribs 60, 62 passing through diametrically opposed radially outwardly extending wing openings 54, 56. Lower ramped ribs 64 limit the insertion of circular damper 48 through aperture 50 so that the lower surface of upper ramped ribs 60, 62 engage or urge against the upper surface of planar damper support plate 52. The installer then rotates circular damper 48 approximately one-quarter turn so that one of upper ramped ribs 60, 62 passes over hemispherical detent bump 66 and locks in position, and another of upper ramped ribs 60, 62 abuts cylindrical stop 68. Upper ramped ribs 60, 62 are ramped on their lower surface such that the upper ramped ribs 60, 62 can pass over hemispherical detent bump 66 to enter the locked position, but cannot easily pass back over hemispherical detent bump 66 to move out of the locked position. Circular damper 48 is thereby locked into the position illustrated in FIG. 4.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A door handle assembly comprising:

a body including pivot points;

a door handle pivoting on said pivot points;

a gear rack formed integrally with said door handle, said gear rack further including a profile formed equidistant from one of said pivot points;

a damper including a rotational gear engaging said extent at a pitch of said extent, whereby said rotational gear rotates in concert with the pivoting of said door handle;

a damper support plate engaging said body, said damper support plate further including an aperture for engaging said rotational damper, wherein said aperture is generally circular and includes radially outwardly extending openings; and wherein said rotational damper includes a cylindrical portion with a first pair of radially extending ribs which pass through said radially extending openings and a second pair of radially extending ribs which limit the insertion of said rotational damper through said damper support plate.

2. The door handle assembly of claim 1 wherein said second pair of radially extending ribs is longitudinally and rotationally offset from said first pair of radially extending ribs.

3. The door handle assembly of claim 2 wherein detent elements are formed on a surface of said damper support plate outwardly adjacent from said aperture for engaging said first pair of radially extending ribs.

4. The door handle assembly of claim 3 wherein said detent elements include a hemispherical protrusion and a cylindrical stop.

5. The door handle assembly of claim 4 wherein a face of said first pair of radially extending ribs facing said second pair of radially extending ribs is ramped whereby at least one of said first pair of radially extending ribs can pass relatively freely over said hemispherical protrusion in a first direction of rotation but cannot pass relatively freely over said hemispherical protrusion in a second direction of rotation opposite from said first direction of rotation.

6. The door handle assembly of claim 5 wherein a longitudinally measured distance between said first pair of radially extending ribs and said second pair of radially extending ribs is equal to a thickness of said damper support plate.

* * * * *